United States Patent [19]

Anson

[11] Patent Number: 4,773,313
[45] Date of Patent: Sep. 27, 1988

[54] ICED TEA BREWER WITH PORTABLE SERVER

[75] Inventor: James H. Anson, Auburn, Ill.

[73] Assignee: Bunn-O-Matic Corporation, Springfield, Ill.

[21] Appl. No.: 145,913

[22] Filed: Jan. 20, 1988

[51] Int. Cl.[4] .............................................. A47J 31/46
[52] U.S. Cl. ....................................... 99/279; 99/290; 99/295; 141/379
[58] Field of Search .................. 99/279, 295, 306, 275, 99/284, 291, 300, 304, 307, 316, 290; 222/608, 173; 141/378, 379; 426/433

[56] References Cited

U.S. PATENT DOCUMENTS

| 4,207,809 | 6/1980 | Brill | 99/279 |
| 4,303,525 | 12/1981 | Stover | 99/306 |
| 4,309,939 | 1/1982 | Stover | 99/295 |
| 4,579,048 | 4/1986 | Stover | 99/295 |
| 4,621,571 | 11/1986 | Roberts | 99/295 |
| 4,642,190 | 2/1987 | Zimmerman | 99/306 |

*Primary Examiner*—Robert W. Jenkins
*Attorney, Agent, or Firm*—Lockwood, Alex, FitzGibbon & Cummings

[57] ABSTRACT

A beverage maker and serving unit system comprising a beverage maker and a portable beverage server. The beverage maker supports a brewing funnel over a platform on which the server sets when positioned to receive a stream of fresh brewed coffee or tea from the brewing funnel. When the system is designed for making iced tea the beverage maker will have a separate outlet for discharging diluting water into an opening in the server when the server is positioned all the way back on the platform. For support, the server has a set of front legs, a set of rear legs, and a set of intermediate legs all of which rest on the platform when the server is being filled. The server also has a lifting bail which cannot be fully raised until the server is filled and moved forward on the platform to where the intermediate legs engage upstanding detents on the front of the platform. When the server is setting back on the platform and being filled, the front legs engage the detents. The center of gravity of the server is located at or to the rear of its intermediate legs so that the server will remain stable on the platform and not tilt when it is moved forward to where the intermediate legs engage the detents and the bail can be raised so it can be used to lift the server off the platform.

4 Claims, 1 Drawing Sheet

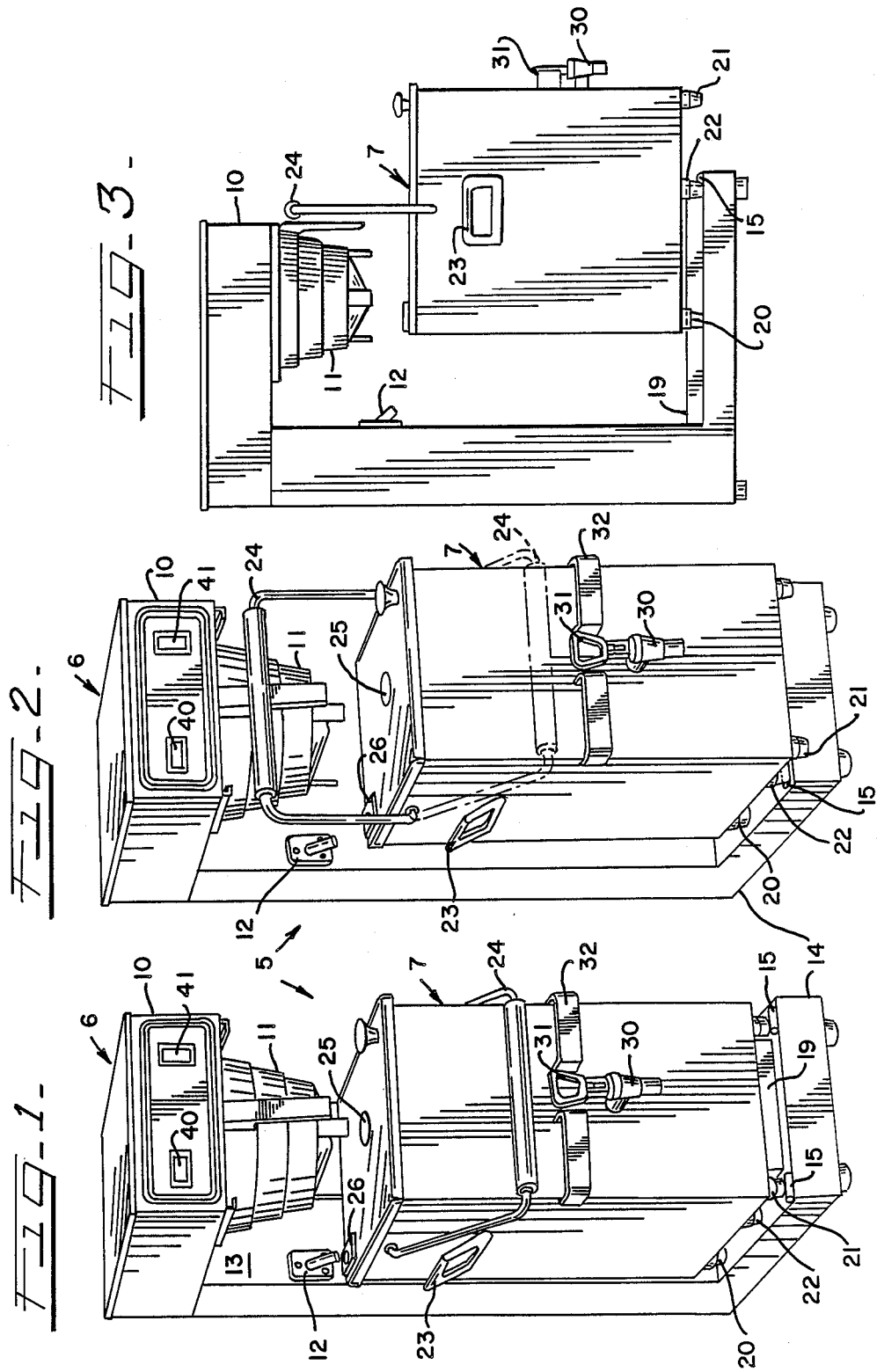

ICED TEA BREWER WITH PORTABLE SERVER

This invention relates generally to innovations and improvements in a combination beverage brewing and serving system in which there is a portable beverage server from which beverage may be dispensed either with the server remaining in place on the brewer or with the server having been lifted and transported to a location removed from the brewer.

The invention is particularly useful in connection with an iced tea brewer and portable server system in which the server receives a tea concentrate discharging from a brewing funnel and also receives a predetermined amount of diluting water. When the server is being filled, it is placed in a particular retracted position on a platform forming part of the brewer with the inlet opening in the top of the server for receiving fresh brewed coffee or tea positioned directly underneath the outlet of the brewing funnel and in the case of iced tea, the diluting water inlet of the server is positioned to receive a stream of diluting water discharging from an outlet on the brewer.

The server is provided with a set of rear support legs, a set of front support legs and a set of intermediate support legs. In its filling position on the brewer platform, the front sides of the front support legs engage the rear sides of raised server locating detents which are located adjacent the front edge or margin of the platform. In the event it is desired to remove a filled server to a different location by means of a lifting bail with which it is provided, the server has to be moved forward on the platform until the intermediate support legs engage the raised detents whereupon the bail can be fully raised and used in lifting and transporting the server. Thus, the upstanding detents on the platform not only serve to indicate the proper location of the server when it is being filled but more importantly indicate the position into which it is safe to move the server forward on the platform wherein it will not tilt or become unstable and the bail can be fully raised for lifting.

Since the server will be resting and supported only on its rear support legs and intermediate support legs when it is moved forward sufficiently to allow the raising of the bail, stability requires that the center of gravity of the server whether empty, partially filled or fully filled be located at or to the rear of its intermediate support legs.

From the foregoing, it is will be seen that the object of the invention, generally stated, is the provision of a beverage maker and server unit or combination wherein the server may be used to dispense beverage while remaining in place in its filling position on a beverage brewer or may be safely removed therefrom and transported to a different location from which its contents can be dispensed.

An important object of the invention is the provision of a beverage maker and serving unit combination or system in which the server is provided with a lifting bail which cannot be fully raised and utilized for lifting when the server is in the position on a beverage maker platform in which it can be filled with fresh brewed beverage, with or without diluting water, and the server is also provided with front, rear and intermediate support legs the latter of which interact with detents on a support platform whereby the interaction can be relied on by the operator to indicate when the filled server has been advanced on the platform far enough to allow the lifting bail to be fully raised while the server rests in stable condition on the intermediate and rear support legs.

Certain other important and more specific objects of the invention will be apparent to those skilled in the art particularly when the invention is viewed in light of the following detailed description of a presently preferred embodiment taken in connection with the accompanying drawings wherein:

FIG. 1 is a perspective view showing the front and one side of a beverage maker and serving unit combination embodying the present invention with the server in its retracted position for filling;

FIG. 2 is a perspective similar to FIG. 1 but showing the server of the combination resting on its rear and intermediate legs in a stable forward position on the support platform of the beverage maker and with its lifting bail fully lifted so that it can be utilized in lifting the serving unit and removing from the beverage maker; and FIG. 3 is a side elevation of the combination server unit with the bail raised as shown in FIG. 2.

The combination beverage maker and server system is indicated generally at 5 and comprises a beverage maker indicated generally at 6 and a portable beverage server or dispenser indicated generally at 7. The system 5 is particularly useful in the making and serving of iced tea although it could also be used in making and serving iced coffee. The construction and operation of the brewer 6 do not in themselves form a part of the present invention except to the extent that it incorporates specific features which relate to use of the server or dispenser 7 and which will be noted below. Thus, the construction and operation of the brewer 6 may follow generally the construction and operation of the beverage maker shown and disclosed in U.S. Pat. No. 4,579,048 dated Apr. 1, 1986 the disclosure of which is incorporated herein by reference, more particularly as it relates to the embodiment shown and described in connection with FIGS. 2, 8 and 10.

The overhanging or cantilevered portion 10 of the brewer superstructure is adapted to have a removable brewing funnel 11 inserted in a underneath position as shown. The brewing funnel 11 may incorporate the structural details and functional features shown and disclosed in U.S. Pat. Nos. 4,303,525 dated Dec. 1, 1981 and 4,642,190 dated Feb. 10, 1987, the disclosures of which are incorporated herein by reference.

The brewer 6 is provided with a diluting water outlet 12 in the upstanding trunk portion 13 and includes a server support platform 14. A novel feature of the platform 14 and brewer 6 is the provision of a pair of raised or upstanding detents 15—15 (FIGS. 1 and 2) adjacent the front edge or margin of the platform 14. The detents 15 are provided and have utility as locators for the positioning of the server or dispenser 7, first when it is being filled, and later when it is being positioned for removal.

The server or dispenser 7 is rectangular in configuration and in general comprises an insulated container capable of holding up to three gallons of beverage. The details of construction of the server 7 are not a part of the present invention except as noted herein and brought out in the accompanying claims. In this connection, the server 7 has a pair or set of rear support legs 20, a set or pair of front support legs or feet 21, and a set or pair of intermediate support feet or legs 22. In one embodiment wherein the portable server had a 3.5 gallons capacity, the front to rear spacing between legs 20 and 22 was 6½ inches, and between legs 22 and 21 was 4½ inches. On its sides, the dispenser or server 7 is provided with lifting handles 23 and a lifting bail 24. The bail is shown in its fully raised and lifting position in solid line FIGS. 2 and 3 and in its fully lowered position in solid line in FIG. 1. In FIGS. 2 and 3, the bail 24 is also shown in broken line in its lowered position.

The bail 24 is so positioned and dimensioned that it is pivotally connected or attached to the server 7 at a location which from the front to rear corresponds to the vertical plane in which the center of gravity of the server 7 is located. Thus, when the server 7 is lifted by the bail 24, it will assume a non-tilted condition.

The server 7 has in its top central portion a beverage concentrate inlet opening 25 in approximately its center and adjacent one of the rear corners it also has a diluting water inlet opening indicated at 26. When the server 7 is positioned in its rear position on the platform 14 so that the front legs 21 are behind the detents 15 and the openings 25 and 26 are positioned to receive beverage concentrate and diluting water respectively, it is not possible to raise the bail 24 to its lifting position as shown in FIGS. 2 and 3 since there will be interference with the brewing funnel 11. However, when the server 7 is moved forward on the platform 14 away from the trunk 13 so that the intermediate legs or supports 22 engage the rear sides of the detents 15 as shown in FIGS. 2 and 3, then it will be possible to fully raise the bail 24 and use it for lifting the server 7 and for carrying it to a desired location.

For dispensing purposes, the server 7 is provided with a faucet 30 of known design the operating handle 31 of which is located in a recess in a horizontal forwardly projecting guard rail 32.

In order to facilitate placing the server 7 in the proper position on the platform 14 for filling, and also to prevent the server 7 from inadvertently slipping off to one side or the other of the platform, a guide 19 is mounted on the top of the platform. The width of the guide plate 19 is such that there is adequate clearance between the legs 20, 21 and 22 and the opposite sides of the guide. Likewise, there should be a clearance between the bottom of the server 7 and the top of guide 19.

In use, the brewing funnel 11 lined with a paper filter and containing the desired amount of dry tea (or ground coffee) is inserted underneath the overhang portion 10. An empty and clean server 7 is positioned fully to the rear on the platform 14 as shown in FIGS. 1 and 2 with the openings 25 and 26 in the top thereof being properly positioned under the outlet to the funnel 11 and the diluting water spout 12, respectively. The operator next manipulates a switch 40 to either the left or right depending upon whether or not it is desired to make a full batch of iced tea (e.g. 3 gallons) or a half a batch (e.g. 1.5 gallons). Thereafter, the starter switch 41 is temporarily depressed and released which activates the brewing cycle and the flow of the appropriate quantity of diluting water through the nozzle 12 as disclosed in the above-mentioned U.S. Pat. No. 4,579,048.

After the brewing cycle is completed and flows of tea concentrate and diluting water have stopped, the operator utilizes the side handles 23 to move the server 7 forward on the platform 14 to the position shown in FIGS. 2 and 3, tilting it upward sufficiently so that the front legs 21 will clear the detents 15 and then lowering the server so that the intermediate legs 22 will engage the back sides of the detents 15. As noted above, the server 7 will be in a stable condition when it is in the position shown in FIGS. 2 and 3, whether fully or partially filled, since the center of gravity in either case will be above or to the rear of the intermediate legs 22. However, in this position, the handle 24 can be fully raised and the operator can use it to lift the server 7 from the platform 14 and transport it to the desired location.

What is claimed is:

1. A beverage maker and server combination comprising, a beverage maker having a server support platform with a front end and a rear end, an upstanding trunk at the rear end of said platform, and a superstructure mounted on said trunk including a brewing funnel support portion extending in cantilever fashion over said platform, a beverage server removably mounted on said platform underneath said brewing funnel support portion in beverage-receiving relationship relative to a brewing funnel inserted underneath said brewing funnel support portion, said server having rear support means which rest on said platform adjacent its rear end when the server is in its said beverage receiving relationship, front support means which rest on said platform adjacent its front end when said server is in its said beverage receiving relationship, and intermediate platform engaging support means, the center of gravity of said server when empty, filled or partly filled lying to the rear of said intermediate support means whereby said server will be stable when setting only on its rear support means and intermediate support means with said front support means overhanging the front end of said platform, and said server having a carrying bail attached thereto and pivotal between a lowered position wherein it fits underneath a said brewing funnel support and a raised carrying position which can be achieved only when said server is moved forward on said platform and is resting only on said rear and intermediate support means and said intermediate support means are resting on said platform adjacent its front end, and said platform having raised detent means adjacent its front end positioned to be forward of and juxtaposed to said front support means when said server is in its beverage receiving relationship, and said bail being raisable to its said server carrying position when said intermediate support means are in engagement with the rear of said detent means.

2. The combination called for in claim 1 wherein said beverage maker includes a diluting water outlet and said server has a diluting water inlet which is aligned with said outlet when said beverage maker is in its said beverage receiving relationship on said platform 3. The combination called for in claim 1 wherein said rear, front and intermediate support means comprise a plurality of legs.

4. The combination called for in claim 4 wherein a guide plate is mounted on said platform which fits underneath said server and in between said plurality of said server support legs

* * * * *